Feb. 23, 1960 G. A. LYON 2,926,045
WHEEL COVER
Filed June 7, 1956
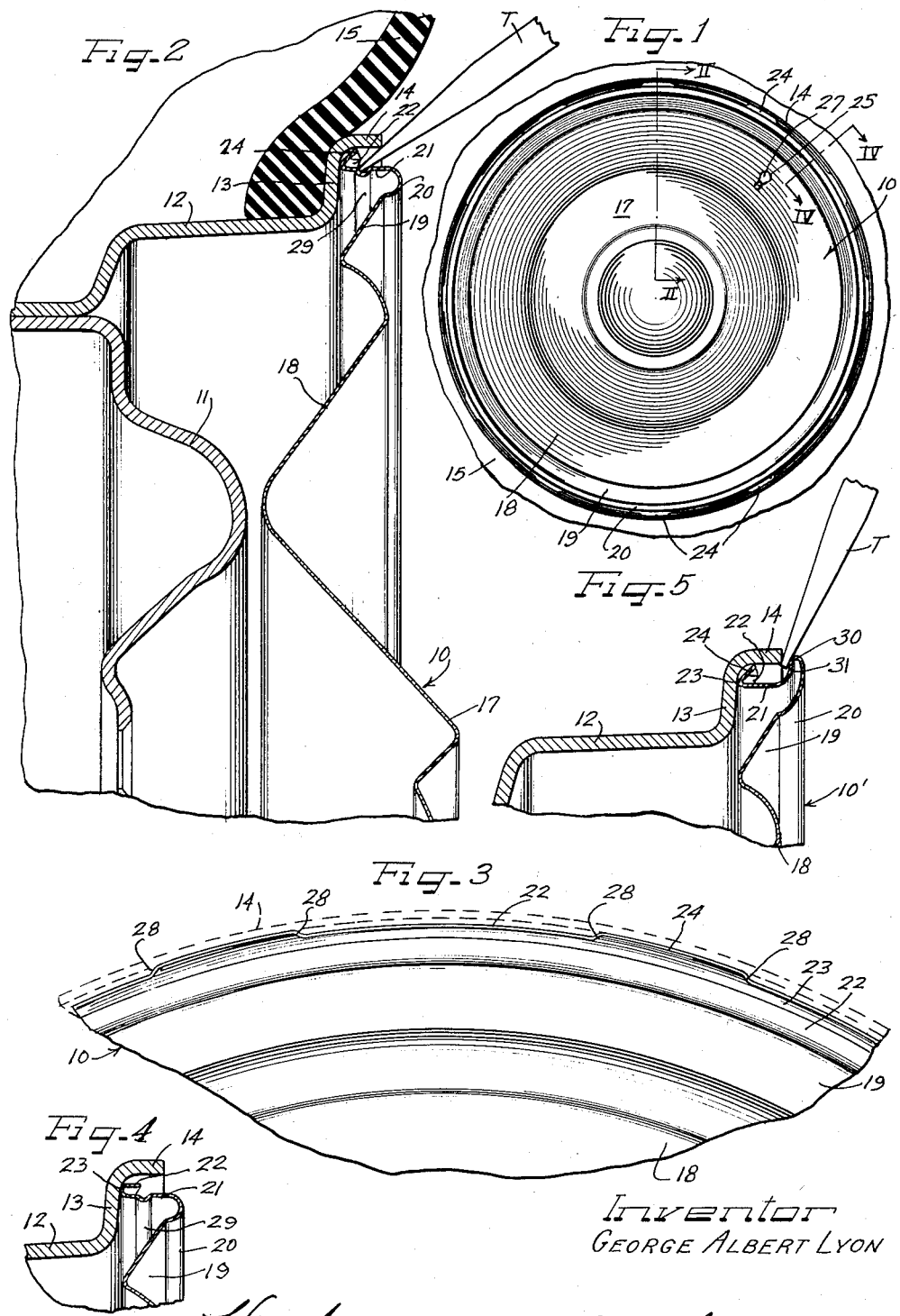
Inventor
GEORGE ALBERT LYON

United States Patent Office 2,926,045
Patented Feb. 23, 1960

2,926,045
WHEEL COVER
George Albert Lyon, Detroit, Mich.
Application June 7, 1956, Serial No. 589,913
10 Claims. (Cl. 301—37)

The present invention relates to improvements in wheel structures and more particularly concerns the ornamental and protective covering of the outer sides of vehicle wheels.

An important object of the present invention is to provide a wheel structure embodying an improved cover for disposition at the outer side thereof adapted for press-on, pry-off retaining engagement with the terminal flange of the tire rim of the wheel.

Another object of the invention is to provide an improved wheel structure especially of the small diameter currently in vogue and provided with a cover of economical one piece sheet metal construction with means thereon for retaining engagement with the terminal flange of the wheel.

A further object of the invention is to provide improved means in a wheel cover for retaining press-on pry-off engagement with a flanged wheel part.

Still another object of the invention is to provide improved retaining means on a wheel cover.

Other objects, features and advantages of the present invention will be readily apparent from the following detailed description of certain preferred embodiments thereof taken in conjunction with the accompanying drawing in which:

Figure 1 is an outer side elevational view of a wheel structure embodying features of the invention;

Figure 2 is an enlarged fragmentary radial sectional view taken substantially on the line II—II of Figure 1;

Figure 3 is a fragmentary outer face elevational view showing one marginal portion of the cover of Figures 1 and 2;

Figure 4 is a fragmentary sectional detail view, on an enlarged scale, taken substantially on the line IV—IV of Figure 1; and Figure 5 is a fragmentary radial sectional view through a wheel structure showing a slight modification.

According to the present invention, a wheel cover 10 is adapted to be applied in press-on, pry-off relation to the outer side of a vehicle wheel of the current small diameter, namely a fourteen inch wheel, although if desired, of course, the cover could be adapted for a larger size wheel, or even a smaller size. The wheel includes a wheel body 11 supporting a tire rim 12 having a terminal flange structure including a generally radially outwardly extending and axially outwardly facing portion 13 and a generally axially outwardly extending and radially facing extremity portion 14. In this instance the extremity portion 14 is of substantially straight form although it may have a slight tilting angle such as about 3° tilt in a radially outward direction or 3° tilt in a radially inward direction. The tire rim is of the multi-flange type adapted to support a pneumatic tire 15.

Although the cover 10 could be a trim ring annulus for overlying the tire rim and an adjacent portion of the wheel body, it is herein shown as a one piece full disk cover that overlies not only the wheel body 11 but also the tire rim 12. To this end the cover 10 includes a central crown portion 17, an intermediate annular portion 18 and an outer marginal annular portion 19 dimensioned to overlie the terminal flange portion 13 of the tire rim. At its outer extremity the annular cover portion 19 is provided with an annular generally axially outwardly projecting reinforcing edge rib 20, the diameter at the outer side of which is somewhat less than the inside diameter of the terminal flange extremity portion 14.

For retaining the cover 10 on the wheel, the outer marginal portion 19 and more particularly the radially outer side of the reinforcing bead or rib 20 thereof is provided with a generally axially inwardly extending annular flange 21 which is adapted to extend in radially spaced telescopic relation within the terminal flange extremity portion 14. At its axially inner extremity the axial flange 21 is provided with an annular continuous return-bent short terminal flange 22 which is slightly spaced radially outwardly from the adjacent axially inner portion of the flange 21 and is of a slightly smaller outside diameter than the inside diameter of the terminal flange extremity portion 14. At juncture of the flange portion 22 with the flange 21 is a generally axially inwardly facing seating shoulder 23 which in assembly bottoms against the radially outermost portion of the terminal flange part or section 13 adjacent juncture thereof with the extremity portion 14 of the terminal flange structure.

Retaining gripping interengagement with the radially inner face of the terminal flange extremity portion 14 is effected by providing the return-bent cover terminal flange 22 with finger-like generally radially and axially outwardly oblique cover retaining finger offsets 24. There is preferably a substantial plurality of the retaining finger projections 24 circumferentially spaced about the circumference of the flange portion 22, twelve of the finger projections being shown in Figure 1, although a larger or smaller number may be used depending upon various factors such as diameter of the wheel and thus of the cover, weight of the cover, type of material from which the cover is made, and the like. The normal diameter to which the tips of the finger projections 24 extend is slightly greater than the inside diameter described about at least the axially inner portion of the terminal flange extremity portion 14. As shown in Figure 3, each of the finger projections 24 provides a gripping edge of substantial circumferential width and having a radius of curvature generally complementary to the curvature of the annular wheel flange portion 14, thereby affording excellent interengagement of the substantial edges of the finger projections 24 with the wheel flange.

In applying the cover 10 to the outer side of the wheel, a valve stem aperture 25 in the cover portion 18 is registered with a valve stem 27, and the cover is then pressed axially inwardly which causes the retaining finger extensions 24 to cam axially inwardly along the inner face of the terminal flange portion 14 and with the tips of the retaining finger projections in retaining gripping tensioned engagement with the terminal flange portion 14. As the tips of the finger extensions 24 cam inwardly on the terminal flange portion 14, they are uniformly compressed radially inwardly and since they are connected by angular generally triangular offsetting side portions 28 to the body of the return-bent flange portion 22, substantial rigidity is provided. Hence, there is a tensioning flexure developed not only in the return-bent flange portion 22 but also in the adjacent portions of the axial flange 21 which because of its substantially greater length is substantially more flexible in a radially deflectable relation. Since the entire flange structure is continuous it will be clear that all parts of the retaining flange cooperate mutually in attaining a strong resilient tensioning radially outwardly thrusting force or pressure toward the retaining finger projections 24 and thereby driving the edges presented by the finger extensions strongly against the radially inner surface of the terminal flange extremity portion 14. In the fully seated condition of the cover the seating shoulder 23 rests against the terminal flange portion 13 and thus determines the axially inward disposition of the cover.

For removing the cover from the wheel, means are provided to enable the application of a pry-off tool T to the outer margin of the cover for prying it free from the tire rim. To this end, a pry-off tool picket or socket structure 29 is provided in the axial marginal flange 21 of the cover. In the present instance such structure comprises a continuous annular axially inwardly projecting rib formed intermediately in the flange 21 but located a shorter distance from the seating shoulder 23 of the cover terminal flange structure than the length of the terminal flange extremity portion 14, so that the radially outwardly opening groove or socket defined by the rib 29 is disposed axially inwardly relative to the tip of the terminal flange portion 14. Thereby, the pry-off tool T can be applied with the tip thereof disposed in the pry-off groove at an efficient generally radially and axially inward angle for fulcruming against the terminal flange tip to at least substantially initiate axially outwardly pry-off displacement of the retaining finger projections 24 so that for final pry-off the tip of the tool can be inserted inwardly behind the return-bent flange extremity 22 of the cover for pry-off leverage behind the seating shoulder 23.

In addition to providing convenient pry-off shoulder means, the rib 29 serves also to afford substantial reinforcement for the axial cover terminal flange 21 whereby further to enhance the resiliency thereof which is already substantially stiffened by the reinforcing juncture 23 with the short return-bent terminal portion 22 of the flange. As a result, the resilient tensioning thrust afforded for the tips of the retaining finger projections 24 is quite substantial and effective in maintaining the retaining grip of the finger projections upon the tire rim terminal flange extremity portion 14 in service.

In the modification of Figure 5 the wheel structure is substantially the same as in Figures 1 and 2 with the exception of the means provided for pry-off of the cover. Since there is such similarity, similar reference numerals are used to indicate like parts. However, in Figure 5 the cover 10' has the outer marginal reinforcing annular rib 20 provided with a generally radially outwardly projecting annular fold-like portion 30 of a diameter to overlie the tip of the terminal flange extremity portion 14 and providing as a juncture with the flange 21 an underturned axially inwardly facing and radially inwardly directed flange portion 31 that affords a pry-off shoulder slightly spaced from the tip of the terminal flange. Thereby the tip of the pry-off tool T is adapted to be inserted between the shoulder flange portion 31 and the tip of the terminal flange for effecting pry-off leverage against the wheel margin.

It will be understood that modifications and variations may be effected without departing from the scope of the novel concepts of the present invention.

I claim as my invention:

1. In a wheel structure including a radially facing and axially substantially straight annular portion, a cover for disposition at the outer side of the wheel having a generally axially inwardly extending annular flange located on a diameter to be in adjacent but spaced telescoped relation to said annular wheel portion, said flange having on its axially inner terminus a return-bent continuous annular flange terminal for extending generally axially outwardly in the space between said flange and said annular wheel portion and throughout its major annular extent spaced from said annular wheel portion, and retaining finger means offset at minor circumferentially spaced intervals from and out of the general plane of said flange terminal toward said annular wheel portion but each providing a gripping edge of substantial circumferential width and of radius of curvature generally complementary to the curvature of the annular wheel portion for retaining gripping engagement with said annular wheel portion.

2. In a wheel structure including a radially facing and axially substantially straight annular portion, a cover for disposition at the outer side of the wheel having a generally axially inwardly extending annular flange located on a diameter to be in adjacent but spaced telescoped relation to said annular wheel portion, said flange having on its axially inner terminus a return-bent continuous annular flange terminal for extending generally axially outwardly in the space between said flange and said annular wheel portion and throughout its major annular extent spaced from said annular wheel portion, and retaining finger means offset at minor circumferentially spaced intervals from and out of the general plane of said flange terminal toward said annular wheel portion but each providing a gripping edge of substantial circumferential width and of a radius of curvature generally complementary to the curvature of the annular wheel portion for retaining gripping engagement with said annular wheel portion, said retaining finger means being connected at the sides thereof with the flange terminal by means of offsetting flange juncture structure whereby to effect a substantially reinforced relationship.

3. In a wheel structure including a radially facing annular portion, a cover for disposition at the outer side of the wheel having a generally axially inwardly extending substantially straight flange located on a diameter to be in adjacent but spaced relation to said annular wheel portion, said flange having on its axially inner terminus a return-bent continuous annular flange terminal for extending generally axially outwardly in the space between said flange and said annular wheel portion and throughout its major annular extent spaced from said annular wheel portion, and retaining finger means offset at minor circumferentially spaced intervals from said flange terminal toward and for retaining gripping engagement with said annular wheel portion, said flange having intermediate its straight length pry-off shoulder means disposed in axially inwardly spaced relation to a pry-off shoulder on the wheel for engagement of the flange shoulder by a pry-off tool fulcrumed against the wheel shoulder.

4. In a wheel structure including an annular radially facing portion, a cover for disposition at the outer side of the wheel including a circular cover member having projecting therebehind a continuous annular flange provided with a return-bent continuous annular terminal having at circumferentially spaced intervals portions thereof offset and providing retaining finger extensions engageable edgewise in retaining gripping relation against said annular wheel portion, said finger projections having at their sides generally triangular reinforcing junctures with said flange terminal.

5. In a wheel structure including a tire rim having a terminal flange including generally radially extending and axially outwardly facing and generally axially outwardly extending and radially inwardly facing portions, a cover for disposition at the outer side of the wheel including a circular cover member having at the radially outer margin thereof a generally axially inwardly extending flange of smaller diameter than said axially extending terminal flange portion and of a diameter to overlie the radially extending terminal flange portion, said cover flange having at the axially inner margin thereof a return-bent short and stiff terminal flange portion disposed at the radially outer side of the cover flange and provided with alternately radially outwardly offset minor width and radially inwardly inset major width portions extending divergently relative to one another and with the radially outwardly offset portions providing retaining finger projections having edges engageable retainingly with the inner side of the axially extending terminal flange portion under resilient tension of the cover flange.

6. In a cover for disposition at the outer side of a vehicle wheel, a circular cover member having projecting to the inner side thereof a cover retaining flange provided with a return-bent short terminal portion, said terminal portion having radially offset from the body thereof a retaining finger of substantial width projecting divergently from said flange and with portions of the terminal portion at opposite sides of the finger inset and extending divergently relative thereto.

7. In a cover for disposition at the outer side of a vehicle wheel, a circular cover member having projecting to the inner side thereof a cover retaining flange provided with a return-bent short terminal portion, said terminal portion having radially offset obliquely divergently from the body thereof a retaining finger projection with portions of the terminal portion at opposite sides of the finger inset relative thereto, said finger projection being joined to the terminal flange portion by generally triangular offsetting reinforcing juncture portions.

8. In a cover for disposition at the outer side of a vehicle wheel, a circular cover member having projecting to the inner side thereof a substantially straight cover retaining flange provided with a return-bent short terminal portion, said terminal portion having radially offset from the body thereof a retaining finger projection with portions of the terminal portion at opposite sides of the finger inset relative thereto, said flange having a reinforcing rib pressed therein intermediate and spaced from the ends thereof and affording a pry-off shoulder.

9. In a wheel structure including an annular radially facing portion, a cover for disposition at the outer side of the wheel including a circular cover member having an annular terminal portion arranged to be in substantially telescoped relation to said radially facing portion, said terminal portion extending generally axially outwardly and having at circumferentially spaced intervals portions thereof offset obliquely divergently relative to intermediate portions of the terminal portion and having side stiffening connections between the offset and intermediate portions, said offset portions providing retaining finger projections engageable edgewise in retaining gripping relation against said radially facing wheel portion under resilient tensioned thrust.

10. In a cover for disposition at the outer side of a vehicle wheel, a circular cover member having projecting to the inner side thereof a cover retaining flange provided with a return-bent short terminal portion, said terminal portion having radially offset from the body thereof a retaining finger of substantial width projecting divergently from said flange and with portions of the terminal portion at opposite sides of the finger inset and extending divergently relative thereto, the cover member including an annular portion having an extremity provided with an outwardly projecting reinforcing rib and said cover-retaining flange being provided on a side of said rib.

References Cited in the file of this patent

UNITED STATES PATENTS

| | | |
|---|---|---|
| 2,308,618 | Lyon | Jan. 19, 1943 |
| 2,567,322 | Curtis | Sept. 11, 1951 |
| 2,683,631 | Lyon | July 13, 1954 |
| 2,690,357 | Lyon | Sept. 28, 1954 |
| 2,747,940 | Tracy | May 29, 1956 |
| 2,772,924 | Landell | Dec. 4, 1956 |